United States Patent
Moriyama

(10) Patent No.: US 6,848,529 B2
(45) Date of Patent: Feb. 1, 2005

(54) LUBRICANT TANK FOR SNOWMOBILE LUBRICATION SYSTEM

(75) Inventor: Takashi Moriyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 43 days.

(21) Appl. No.: 10/151,464

(22) Filed: May 16, 2002

(65) Prior Publication Data

US 2003/0213637 A1 Nov. 20, 2003

(30) Foreign Application Priority Data

May 16, 2001 (JP) ....................................... 2001-146799

(51) Int. Cl.$^7$ ................................................ B60K 8/00
(52) U.S. Cl. .................. 180/291; 180/190; 123/196 R; 440/88 L
(58) Field of Search ................................ 180/291, 190, 180/309, 294, 830, 297, 68.1, 68.2, 180, 181, 182; 123/196 A, 196 R, 198 C, 516, 515, 517, 518, 519, 520, 196, 196 E, 184.21, 41.54, 41.1, 41.33; 440/88 L, 88 R, 89 R, 33, 87; 114/55.51; 184/6.5, 106, 104.3, 105.1

(56) References Cited

U.S. PATENT DOCUMENTS

| | | | | |
|---|---|---|---|---|
| 3,871,460 A | * | 3/1975 | Douglas ..................... 180/190 |
| 4,008,777 A | * | 2/1977 | Juto et al. .................... 180/182 |
| 4,766,860 A | * | 8/1988 | Abe et al. ................ 123/196 A |
| 4,848,503 A | * | 7/1989 | Yasui et al. ................. 180/190 |
| 4,892,164 A | * | 1/1990 | Yasui et al. ................ 180/68.3 |
| 5,040,503 A | * | 8/1991 | Schwabe et al. ......... 123/198 E |
| 5,094,638 A | * | 3/1992 | Kobayashi ................... 440/33 |
| 5,117,932 A | * | 6/1992 | Kurosu et al. ............. 180/68.2 |
| 5,152,365 A | * | 10/1992 | Aoshima .................... 180/68.3 |
| 5,174,258 A | * | 12/1992 | Tanaka .................... 123/198 E |
| 5,282,437 A | * | 2/1994 | Avillez de Basto ......... 114/345 |
| 5,839,930 A | | 11/1998 | Nanami et al. |
| 5,879,211 A | | 3/1999 | Koyanagi |
| 5,899,779 A | | 5/1999 | Hattori |
| 5,951,342 A | | 9/1999 | Ozawa et al. |
| 5,951,343 A | | 9/1999 | Nanami et al. |
| 6,015,320 A | | 1/2000 | Nanami |
| 6,247,442 B1 | * | 6/2001 | Bedard et al. .......... 123/198 E |
| 6,415,759 B2 | * | 7/2002 | Ohrnberger et al. ..... 123/198 E |
| 6,418,887 B1 | * | 7/2002 | Okamoto ................. 123/41.33 |
| 6,447,351 B1 | * | 9/2002 | Nanami ...................... 123/516 |
| 6,464,033 B2 | * | 10/2002 | Izumi et al. ................ 180/291 |
| 6,475,046 B2 | * | 11/2002 | Muramatsu et al. ..... 123/196 R |
| 6,508,211 B1 | * | 1/2003 | Asano ........................ 123/41.1 |
| 6,537,115 B2 | * | 3/2003 | Suganuma et al. ...... 123/198 C |
| 6,544,084 B1 | * | 4/2003 | Nanami ................... 114/55.51 |
| 6,551,153 B1 | * | 4/2003 | Hattori ......................... 440/87 |

FOREIGN PATENT DOCUMENTS

JP 04-135920 * 11/1992 ......... B60K/15/077

* cited by examiner

Primary Examiner—Hau Phan
(74) Attorney, Agent, or Firm—Knobbe, Martens, Olson & Bear LLP

(57) ABSTRACT

A lubricant tank for a lubrication system of a snowmobile engine includes an upper portion and a lower portion. The upper portion is enlarged relative to the lower portion. A recess is defined on an engine side of the lubricant tank by a lower surface of the upper portion and a lateral surface of the lower portion. The recess accommodates a protruding portion or component of the engine. The tank also comprises a sloping surface that extends between the upper portion and the lower portion inside the tank. Lubricant is returned in the upper portion and transferred to the lower portion through a zigzag flow path.

15 Claims, 13 Drawing Sheets

LUBRICANT TANK FOR SNOWMOBILE LUBRICATION SYSTEM

RELATED APPLICATIONS

This application is based upon and claims the priority of Japanese Patent Application No. 2001-146799, filed on May 16, 2001, which is hereby incorporated by reference in its entirety.

BACKGROUND OF THE INVENTION

1. Field of the Invention

The present invention generally relates to a lubrication system for land vehicles. More specifically, the present invention relates to an improved lubrication system for snowmobiles that can be accommodated in a smaller engine compartment.

2. Description of the Related Art

A snowmobile is a land vehicle that is propelled by a drive belt generally centered on a vertical longitudinal central plane. A pair of snow skis are arranged generally forward of the drive belt at locations generally laterally off-set on either side of the vertical longitudinal central plane. An internal combustion engine is coupled to the drive belt to drive the snowmobile over uneven terrain, sometimes at relatively high speeds. The snowmobile engine is generally mounted within a substantially enclosed engine compartment forward of the rider's seat. The engine compartment typically is defined within a cowling and is generally relatively small.

The snowmobile engine has a lubrication system that reduces friction between the moving parts of the engine and thereby reduces heat that is generated by friction during the operation of the engine. Many such engines are dry-sump engines. In other words, the lubrication system of the engine includes a lubricant tank that stores the lubricant that is not circulating through the engine. The lubricant tank is generally positioned within the engine compartment at a location forward of the engine. Unfortunately, locating the lubricant tank forward of the engine requires a larger engine compartment to house the engine and the lubricant tank.

In addition to being mounted longitudinally forward of the engine, the lubricant tank usually has a short and wide profile. In other words, the height (i.e., the vertical dimension of the lubricant tank) is small compared to the longitudinal horizontal dimension (i.e., the dimension of the lubricant tank along a line in or parallel to the vertical longitudinal central plane) and the height is small compared to the transverse horizontal dimension (i.e., the dimension of the lubricant tank along a line transverse, or perpendicular to the vertical longitudinal central plane). Stated another, way, the horizontal cross-sectional area of the lubricant tank is relatively large while the vertical cross-sectional area of the lubricant tank is relatively small. This is disadvantageous because lubricant sloshing caused by the uneven terrain and relatively high speed of the snowmobile can cause air to be entrained with the lubricant, which degrades the performance of the lubrication system.

SUMMARY OF THE INVENTION

Thus, a snowmobile having an engine with a lubrication system that has a lubricant tank that is compactly arranged and that tends to reduce entrained air in the lubricant is desired.

Accordingly, one aspect of the present invention involves a snowmobile that includes a frame assembly that has a forward portion, a forward body cover, an engine, and a lubricant tank. The forward body cover is disposed over the forward portion of the frame assembly. The forward body cover at least partially defines an engine compartment. The engine, which is mounted in the engine compartment generally transversely to the frame assembly, includes a cam shaft chamber, a crankcase chamber, and a laterally extending component. The lubricant tank has a forward portion and a rearward portion. The lubricant tank is mounted within the engine compartment on a lateral side of the engine.

Another aspect of the present invention involves a lubricant tank for a lubrication system of an engine. The lubricant tank has an upper portion and a lower portion. The lubricant tank also has a lubricant return port, a guide, and a baffle. The lubricant return port is located in the upper portion of the lubricant tank. The guide is located within the lubricant tank at an elevation below the lubricant return port. The lubricant return port and the guide are positioned such that lubricant that enters the lubricant tank through the lubricant return port drips onto the guide. The baffle is located at an elevation below the guide. The guide directs the lubricant toward the baffle.

Another aspect of the present invention involves a lubricant level monitoring system for a snowmobile engine lubrication system. The system includes a lubricant tank, a non-operating lubricant level gauge, and an operating lubricant level sensor. The lubricant tank has a non-operating lubricant level gauge boss and an operating lubricant level sensor boss. The non-operating lubricant level gauge, which is insertable into the lubricant level gauge boss of the lubricant tank, indicates the level of the lubricant in the lubricant tank when the engine is not running. The operating lubricant level sensor, which is insertable into the operating lubricant level sensor boss, collects lubricant level data while the engine is operating and provides an alarm if the lubricant level is too low.

A further aspect of the present invention involves a snowmobile comprising a frame assembly having a forward portion. A forward body cover is disposed over the forward portion of the frame assembly with the forward body cover at least partially defining an engine compartment. An engine is mounted in the engine compartment with the engine comprising an engine body defining a cam shaft chamber and a crankcase chamber. An auxiliary component protrudes laterally of the engine body. The engine further comprises a crankshaft that extends generally transverse to a generally vertical longitudinal center plane of the frame assembly. A lubricant tank comprises a forward portion and a rearward portion and is mounted within the engine compartment on a lateral side of the engine body.

An additional aspect of the present invention involves a snowmobile comprising a frame assembly and an engine positioned above a portion of the frame assembly. The engine comprises an engine body that itself comprises a crankcase member, a cylinder block and a cylinder head. A crankcase chamber is partially defined by the crankcase member and a crankshaft extends through the crankcase. The crankshaft extends in a transverse direction relative to a general direction of movement of the snowmobile. A lubricant tank is disposed to a lateral side of the engine such that a rotational axis of the engine intersects a portion of the lubricant tank. The lubricant tank comprises an enlarged upper portion and a reduced lower portion. The upper portion and the lower portion share at least one surface such that a recess region is defined below a portion of the upper portion and to a side of the lower portion. A lubricant return port is located in the upper portion of the lubricant tank and a guide is located in the lubricant tank generally below the lubricant return port. The lubricant tank further comprises a baffle that is disposed vertically lower than the guide and that is positioned generally to one side of the guide at a position within the lower portion of the lubricant tank.

One other aspect of the present invention involves a snowmobile comprising a frame assembly. At least one ski is connected to the frame assembly. An engine is mounted to the frame assembly. A lubricant tank is positioned to a side of the engine. The lubricant tank comprises means for directing returning lubricant to a collecting position in the lubricant tank and the lubricant tank further comprises a recess that accommodates a laterally protruding portion of the engine.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise thirteen figures.

FIG. 12A is a top plan view of the guide. FIG. 12B is a side view of the guide of FIG. 12A taken from the side indicated by the arrows 12B—12B. FIG. 12C is a side view of the guide of FIG. 12A taken from the side indicated by the arrows 12C—12C.

FIG. 13A is a top plan view of one embodiment of a baffle. FIG. 13B is a side view of the baffle of FIG. 13A taken from the side indicated by arrows 13B—13B.

DETAILED DESCRIPTION OF THE PREFERRED EMBODIMENT

Figure 1:
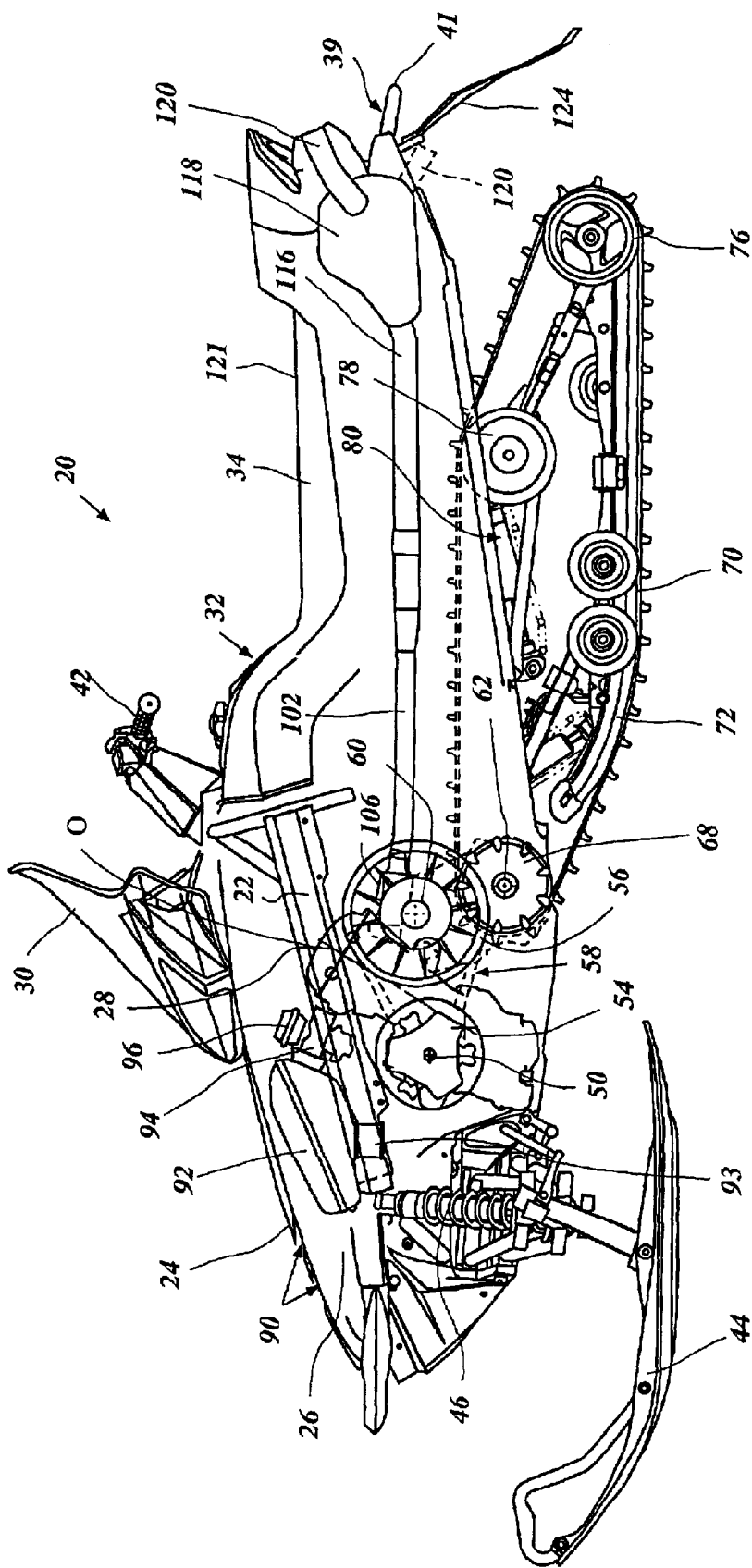
FIG. 1 is a side elevation view of the snowmobile with certain portions broken away and other internal portions shown in hidden line to better illustrate certain features, aspects and advantages of the present invention.

With reference now to FIG. 1, a snowmobile having certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles, such as all-terrain vehicles and watercraft.

Figure 2:
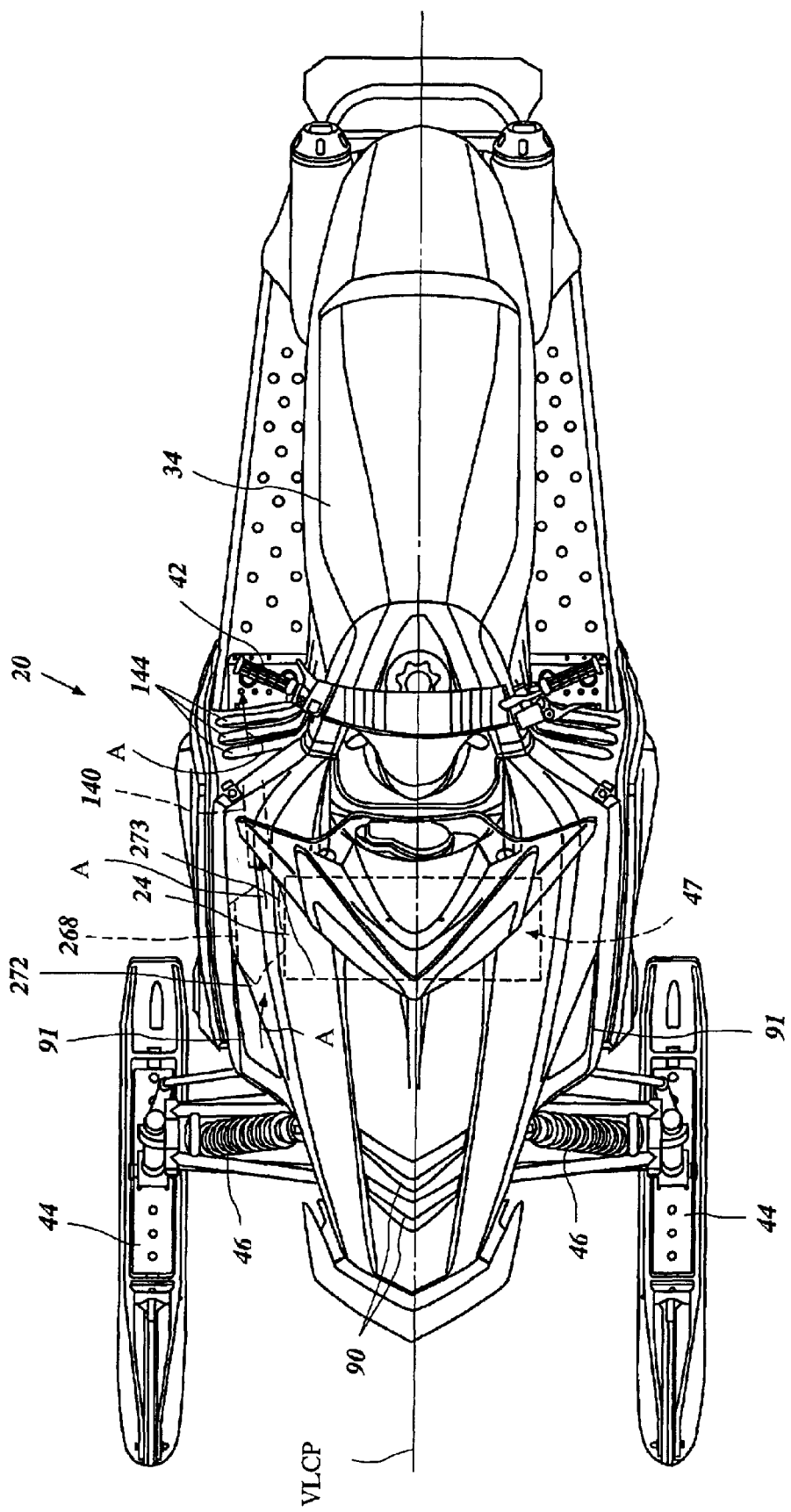
FIG. 2 is a top plan view of the snowmobile of FIG. 1 with certain internal portions shown in hidden line.

The snowmobile 20 generally comprises a frame assembly 22 that carries a number of other components of the snowmobile 20. With reference to FIG. 2, the frame assembly 22 and many of the components positioned relative thereto are arranged along a vertical longitudinal central plane ("VLCP"). A forward body cover 24 is disposed over a forward portion of the frame assembly 22. The forward body cover 24 defines, in part, an engine compartment 26 in which an engine 28 is mounted. The engine 28 will be described in greater detail below in connection with FIG. 4.

A windshield 30 is disposed over a mid-portion of the illustrated body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together.

Rearward of the fuel tank 32, a seat 34 is mounted to the frame assembly 22. Rearward of the seat 34 is positioned a grab bar 39 that comprises a grabbing portion 41 that can be used to raise a rear portion of the snowmobile for turning and maneuvering when the snowmobile is not being ridden. While the illustrated grab bar 39 is generally U-shaped and is mounted in a generally horizontal manner, other forms of grab bars can be used. For instance, the grab bar 39 can be loops, semicircular, vertical or inclined in orientation. In short, any suitable grab bar construction can be used.

Forward of the seat 34 and the fuel tank 32 is a steering handle assembly 42. The steering handle assembly 42 can carry appropriate controls and can be coupled to a pair of front skis 44. Manipulation of the steering handle assembly 42 causes the direction of the snowmobile 20 to be altered. The front skis 44 are mounted to the frame assembly 22 though a front suspension assembly 46. Any suitable front suspension assembly 46 can be used.

The engine 28 in the illustrated arrangement is an inclined L-4 four-cycle engine that is mounted transversely within the engine compartment 26. In other words, the illustrated engine 28 comprises four cylinder bores that extend side-by-side across a width of a cylinder block 47, that extends across a width of the snowmobile 20. The cylinder bores each comprise a center axis O (see FIG. 1) that is inclined relative to vertical. In some arrangements, engines having differing numbers of cylinder bores, different cylinder block configurations (e.g., V, opposing, double V or W etc.), different orientations (e.g., vertical) and different operating principles (e.g., two-stroke, rotary, etc.) can be used.

Figure 4:
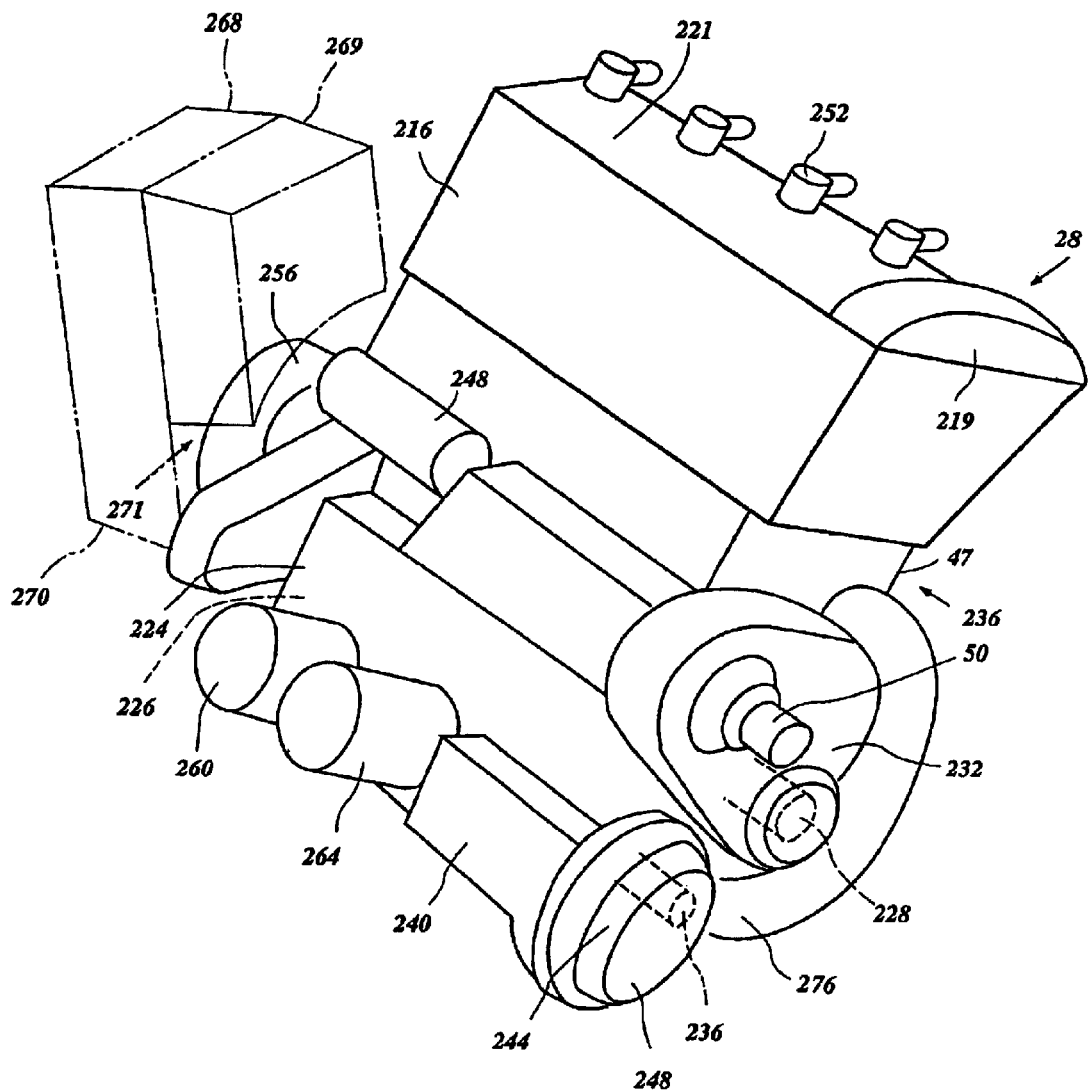
FIG. 4 is a schematic top, front, and side perspective view of an engine of the snowmobile of FIG. 1.

With reference to FIGS. 1 and 4, the engine 28 also comprises an output shaft 50 that drives a transmission, which is a continuously variable transmission 52 in the illustrated arrangement. Other transmissions also can be used. In the illustrated arrangement, the output shaft 50 rotates a drive pulley 54. The output shaft 50 and the drive pulley 54 can be connected together through a clutch, a centrifugal clutch, a sprag clutch (one-way clutch) or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates with a transfer shaft 60 about a transfer axis. In the illustrated arrangement, the transfer shaft 60 carries a sprocket (not shown) at the end opposite to the driven pulley 56. The sprocket is connected to a further sprocket that is carried by a drive shaft 62.

The drive shaft 62 powers a drive unit 64. The drive unit 64 generally comprises a plurality of drive wheels 68. The drive wheels 68 provide a motive force to a drive belt 70, which is commonly used in the snowmobile industry.

With continued reference to FIG. 1, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are conventional and can be arranged and configured in any suitable manner. Additionally, the above-described components can be replaced by other suitable components where desired. Any details omitted to this point have been considered well within the design knowledge of those of ordinary skill in the art.

With continued reference to FIG. 1, air is drawn into the engine compartment 26 through suitable air passages formed in, through and/or around the body cover 24. In some arrangements, the air is drawn through ventilation openings 90 formed in the body cover 24. The air drawn or forced into the engine compartment 26 through the passages circulates about the engine 28 and the related drive components to help cool the engine 28 and the related drive components. As discussed in more detail below in connection with FIG. 2, air also can be drawn or forced into the engine compartment 26 through at least one side ventilation opening 91. The side ventilation openings 91 are generally laterally off-set from the VLCP. In one particularly preferred arrangement, the side ventilation openings a laterally offset from the cylinder block 47 (see FIG. 1).

Some air from within the engine compartment 26 is drawn into an air intake box 92. The air intake box 92 is disposed forward of the engine 28 in the illustrated arrangement. The air intake box 92 can be mounted to the frame assembly 22 in a manner that will be described. An air inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder bore. In some arrangements, a single charge former can be used upstream of a separation point for runners extending to individual cylinder bores. In addition, in the illustrated arrangement, the engine 28 is carbureted. In some arrangements, the charge formers 96 can be fuel injectors that are mounted for direct injection, indirect injection or port injection. The air-fuel charge provided in this manner is combusted within the engine.

The combustion byproducts then are exhausted through a suitable exhaust system 100. In the illustrated arrangement, the exhaust system 100 extends directly rearward from the engine 28. In this manner, an exhaust runner 102 that extends rearward from the engine can be tuned to the engine for improved engine performance. Additionally, the length of each runner 102 can be lengthened prior to merging together with any other runners such that pulse effects on adjoining cylinder bores can be reduced. In some arrangements, an attenuation chamber or passage between two or more runners can be used to reduce the effect of reflected pressure pulses in the exhaust system.

With continued reference to FIG. 1, the exhaust system 100 preferably comprises the exhaust runners 102 that correspond to each cylinder bore and that extend generally rearward from the engine 28. Each exhaust runner 102 is coupled to an exhaust discharge pipe 106 that is individually joined to the engine 28 in the illustrated arrangement. In some arrangements, a single manifold can be used. In the illustrated arrangement, at least two of the runners 102 join at a merge location (not shown) and the merged flow passes through a manifold pipe 116.

The manifold pipes 116 extend rearward to a silencer box 118. The silencer box 118 provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat.

A pair of exhaust pipes 120 extends rearward from the silencer box 118. In some arrangements, a single exhaust pipe 120 can extend from the silencer box 118. Other numbers of exhaust pipes also can be used. One end of each of the exhaust pipes 120 preferably defines an ultimate exhaust discharge 122 from the snowmobile 20 such that the exhaust gases are discharged into the atmosphere at this location. As illustrated in FIG. 1, the exhaust pipes 120 can extend upwardly and rearwardly from the silencer box 118 while, in another arrangement, shown in hidden lines, the exhaust pipes 120 can extend downward to a location forward of a protective flap 124. Preferably, the exhaust pipes 120 terminate at a location forward of the grab portion 41 of the grab bar 39.

With reference to FIG. 2, the snowmobile 20 includes, in one embodiment, a brake assembly 140 located generally rearward of the ventilation opening 91 and one or more engine compartment exhaust ports 144 located generally rearward of the brake assembly 140. As discussed in more detail below, some of the air that enters the engine compartment through the side ventilation opening 91 flows over at least a portion of the brake assembly 140 to the engine compartment exhaust ports 144 and is discharged therethrough to the atmosphere. This discharge location allows heated air to be directed generally toward an operator of the snowmobile.

With reference now to FIGS. 1 and 4, the engine 28 of the illustrated snowmobile 20 will be described in greater detail. The engine 28 includes the cylinder block 47 that defines four combustion bores (not shown) spaced from each other transversely across the snowmobile 20. As discussed above, each of the cylinder bores has a cylinder bore axis O that is slanted or inclined at an angle from a vertical plane that is transverse to the snowmobile 20 so that the engine 28 can be shorter in height.

Pistons (not shown) reciprocate within the cylinder bores. A cylinder head 216 is affixed to the upper end of the cylinder block 47 to close respective upper ends of the cylinder bores and thus define combustion chambers (not shown) with the cylinder bores and the pistons.

Intake and exhaust valves are operated in coordination with the pistons to provide air/fuel charges and to remove burnt charges from the combustion chambers respectively. The valves are driven by a suitable valvetrain, such as a double overhead cam-type valvetrain. In such an arrangement, an intake cam shaft actuates the intake valves and an exhaust cam shaft separately actuates the exhaust valves. The intake cam shaft extends generally horizontally over the intake valves transversely across to the VLCP of the snowmobile 20, and the exhaust cam shaft extends generally horizontally over the exhaust valves transversely across the VLCP of the snowmobile 20.

Both the intake and exhaust cam shafts are journaled by the cylinder head member 216 with a plurality of cam shaft caps (not shown). The cam shaft caps holding the cam shafts are affixed to the cylinder head member 216. A cylinder head cover member 219 extends over the cam shafts and the cam shaft caps, and is affixed to the cylinder head member 216 to define a cam shaft chamber 221. The intake and exhaust cam shafts are arranged to actuate the intake and exhaust valves in a suitable manner.

With reference to FIG. 4, a crankcase member 224 is affixed to the lower end of the cylinder block 47 to define a crankcase chamber 226. A crankshaft 228 is rotatably connected to the pistons in a conventional manner. The crankshaft 228 is journaled in the crankcase member 224 by bearings (not shown). A crankshaft cover 232 that covers an end of the crankshaft 228 and associated components is provided on a lateral side of the crankcase member 224. Rotation of the crankshaft 232 drives the output shaft 50 in any suitable manner. An auxiliary shaft 236 is also journaled in the crankcase member 224 and is rotatably coupled to the crankshaft 228 in a suitable manner. The auxiliary shaft 236 powers a lubricant pump that is at least partially housed within a lubricant pump housing 240. The lubricant pump circulates lubricant in a lubrication system. The terms "oil" and "lubricant" (and variations thereof) are used interchangeably herein, and are intended to mean a lubricant material such as natural petroleum oil, synthetic oil and other materials as known to those skilled in the art for use in lubricating an engine.

The auxiliary shaft 236 also powers a coolant pump that is at least partially housed within a coolant pump housing 244. The coolant pump housing 244 is enclosed by a coolant pump housing cover 248. The coolant pump circulates coolant through a cooling system.

The cylinder block 47, the cylinder head member 216, the crankshaft cover 232 and the crankcase member 224 together define an engine body 236. The engine body 236 preferably is made of an aluminum-based alloy. In the illustrated embodiment, the engine body 236 is oriented in the engine compartment 26 so as to position the crankshaft 228 generally perpendicular to the VLCP of the snowmobile 20 such that the crankshaft 228 extends generally in the transverse direction. Other orientations of the engine body 232, of course, are also possible (e.g., with a longitudinal or vertically-oriented crankshaft 228).

The engine operation is described more fully in Applicant's copending U.S. application Ser. No. 10/094,748, filed Mar. 8, 2002, incorporated herein by reference in its entirety.

The engine 28 includes a variety of sub-systems, including an ignition system, the lubrication system, and the cooling system. With reference to FIG. 4, spark plugs 252, at least one for each of the combustion chambers, are affixed to the cylinder head member 216 so that electrodes, which are defined at one end of the spark plugs 252, are exposed to the respective combustion chambers. The spark plugs 252 preferably are fired in a conventional manner. The air/fuel charge is thereby combusted during every combustion stroke accordingly.

The engine 28 also includes other components relating to engine operations. With reference to FIG. 4, the engine 28 employs a flywheel magneto or AC generator. The flywheel magneto generates electric power that is used for the engine operation as well as for electrical accessories associated with the snowmobile 20. In one embodiment, the flywheel magneto is located on one lateral side of the engine 28 and is enclosed by a flywheel magneto housing 256. Thus, the flywheel magneto or the flywheel magneto housing 256 are laterally extending components of the engine 28. Of course other components of the engine 28 could be located proximate a lateral edge of the engine 28 and could thus be laterally extending components of the engine 28. A starter motor 248 (FIG. 2) rotates the crankshaft 228 for starting the engine 28 in a manner well known to those of ordinary skill in the art. The starter motor may be powered by a battery, which can be charged by the generator.

The coolant system of the engine 28 includes the coolant pump, discussed above, and a coolant conduit 276 that connects the coolant pump to the engine body 236. In addition to the coolant conduit 276, a series of additional conduits provide fluid communication between the engine body 236, at least one heat exchanger, and other components that typically are maintained below a desired temperature.

The lubrication system of the engine 28 includes the lubricant pump, discussed above, a lubricant cooler 260, a lubricant filter 264, and a lubricant tank 268. The lubricant pump circulates lubricant through the engine 28, through the lubricant cooler 260, through the lubricant filter 264, and returns the lubricant to the lubricant tank 268.

The lubricant cooler 260 includes a heat exchanger. Lubricant that enters the lubricant cooler 260 flows through the heat exchanger and is cooled therein. Fluid communication is provided between the lubricant cooler 260 and the lubricant filter 264, e.g., via one or more lubricant passages. Thus, lubricant is directed from the lubricant cooler 260 to the lubricant filter 264. The lubricant filter 264 removes debris from the lubricant.

In one embodiment, the lubricant tank 268 has an upper portion 269 into which lubricant returns after circulating through the engine 28, a lower portion 270 where at least a portion of the lubricant is housed, and a plurality of ports, discussed more fully below, for ingress and egress of the lubricant. The lubricant tank 268 also includes at least one mounting boss that receives a lubricant level sensing component, discussed more fully below.

The lubricant tank 268, illustrated in dashed lines in FIG. 4, is preferably configured to reside very close to a lateral side of the engine 28. In one embodiment, the configuration of the upper portion 269 and the lower portion 270 are such that one or more laterally extending components of the engine 28, i.e., one or more components that protrude laterally from a side surface of the engine body 236, can be accommodated in a recess portion 271 at least partially defined by the upper portion 269 and the lower portion 270 of the lubricant tank 268. In the illustrated arrangement, the lower portion 270 has a reduced horizontal cross-section relative to the upper portion 269 such that the recess portion 271 is defined by the two portions. By providing the recess portion 271, the lubricant tank 268 and the engine 28 can be arranged more compactly within the engine compartment 26. A compact arrangement of components thus provided advantageously results in a smaller overall vehicle body, additional space in the engine compartment 26 for other components, or other advantages that will be apparent to one skilled in the art from the description herein.

With reference to FIG. 2, the lubricant tank 268 has a forward portion 272 and a rearward portion 273. The lubricant tank 268 is located generally between the ventilation opening 91 and the engine compartment exhaust ports 144. An airflow path generally indicated by the arrows labeled "A" is defined within the engine compartment 26 during movement of the snowmobile. In some arrangements, a cooling fan can be used to draw air along the airflow path.

The ventilation opening 91, as discussed above, is defined in the forward body cover 24 to admit air into the engine compartment 26. The engine compartment exhaust ports 144 are located generally rearward of the brake assembly 140. The engine compartment exhaust ports 144 communicate with the atmosphere. In one embodiment, the airflow path, indicated by the arrows labeled "A", extends between the side ventilation opening 91 and the forward portion 272 of the lubricant tank 268. In another embodiment, the airflow path extends between the ventilation opening 90 and the forward portion 272 of the lubricant tank 268. The airflow path indicated by the arrows labeled "A" further extends between the rearward portion 273 of the lubricant tank 268 and the brake assembly 140. The airflow path indicated by the arrow "A" further extends between the brake assembly 140 and the engine compartment exhaust ports 144.

This arrangement provides several advantages. For example, each of the ventilation opening 91, the lubricant tank 268, the brake assembly 140, and the engine compartment exhaust ports 144 are off-set from the VLCP of the snowmobile 20. More generally, these components are located at one or more lateral positions between the lateralmost extending component of the engine 28 and the lateralmost portion of the snowmobile 20. Thus, these components do not require the longitudinal dimension of the engine compartment 26 or the snowmobile 20 to be increased to accommodate them. In addition, the lubricant tank 268 and the brake assembly 140 are cooled by the relatively low temperature of the airflow between the ventilation openings 90, 91 and the engine compartment exhaust ports 144. A further benefit is provided in that heat exchange between the lubricant tank 268 and the airflow and between the brake assembly 140 and the airflow increases the temperature of the airflow downstream of the lubricant tank 268 and downstream of the brake assembly 140. As a result, the airflow exiting the engine compartment 26 through the engine compartment exhaust ports 144 may be warm enough to warm the leg of the rider. This increases the comfort of the rider in the cold environment in which the snowmobile 20 is operated.

With reference now to FIGS. 5–13, various features of the lubricant tank 268 will be described in greater detail. In the illustrated embodiment, the lubricant tank 268 includes a first lateral portion 304, a second lateral portion 308, a flange 312, and a mounting bracket 316. The first lateral portion 304 and the second lateral portion 308 preferably are joined at the flange 312. The first lateral portion 304 and the second lateral portion 308 at least partially defining a volume for housing lubricant within the lubricant tank 268. In the illustrated embodiment, the lubricant tank 268 is mounted in the engine compartment 26, e.g., mounted to the engine 28, by the bracket 316. One skilled in the art will recognize that the bracket 316 could also mount the lubricant tank 268 to the frame 22 of the snowmobile 20, or any other suitable component in the engine compartment 26.

As discussed above, in connection with the engine 28 of FIG. 4, one embodiment of the lubricant tank 268 can be mounted proximate the engine 28, spaced laterally outwardly therefrom. The lubricant tank 268 can be configured to accommodate at least a portion of one or more laterally extending components of the engine 28. This construction of the lubricant tank 268 and the engine 28 is advantageous because it provides a more compact combination of the engine 28 and the tank 268, which enables the engine compartment 26 to be made smaller or provides space for other components therein.

The first lateral portion 304 preferably is the portion that resides farthest laterally from the VLCP of the snowmobile 20 when the lubricant tank 268 is mounted in the engine compartment 26. The first lateral portion 304 comprises a lubricant supply port 320 and a lubricant drain 324. The lubricant drain 324 provides an outlet for the lubricant tank 268 through which the lubricant that is housed in the lubricant tank 268 can be removed from the lubrication system for replacement, for testing, or for any other purpose. The lubricant supply port 320 provides an outlet for lubricant that is housed in the lubricant tank 268. Lubricant that passes through the lubricant supply port 320 enters the series of lubricant passages of the engine 28 and is thereby provided to the various moving components of the engine 28. After being supplied to the various moving components of the engine 28, the lubricant is returned to the lubricant tank 268 through another series of passages for further circulation in the lubrication system.

Figure 3:
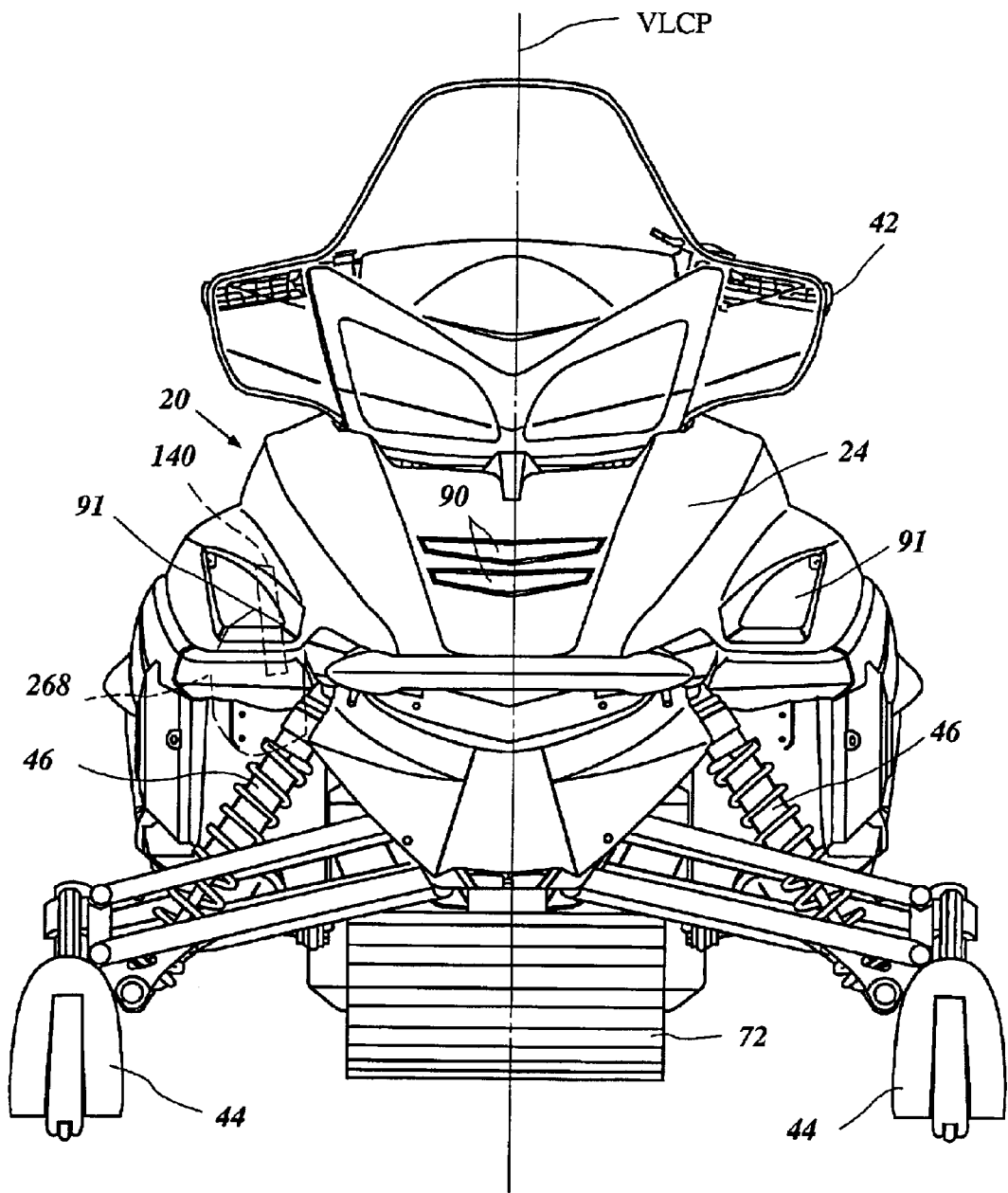
FIG. 3 is a front elevation view of the snowmobile of FIG. 1.

Preferably the lubricant tank 268 has a generally vertically elongated shape. In other words, the height H of the lubricant tank 268 (i.e., the vertical dimension) is relatively large compared to the longitudinal horizontal dimension D1 of the lubricant tank 268 (i.e., the dimension along a horizontal plane parallel to the VLCP). See FIGS. 2 and 5. The height H of the lubricant tank 268 is large compared to the transverse horizontal dimension D2 of the lubricant tank 268 (i.e., the dimension along a line transverse, or perpendicular to the VLCP). See FIGS. 3 and 7. This configuration provides a lubricant tank 268 having a horizontal cross-sectional area that is relatively small and having a lubricant column within the lubricant tank 268 that is relatively tall. This arrangement advantageously increases the space between the top of the lubricant column and the lubricant supply port 320. By increasing the spacing between the top of the lubricant column and the lubricant supply port 320, the gases in the lubricant tank 268 are much less likely to be entrained in the lubrication system.

Figure 5:
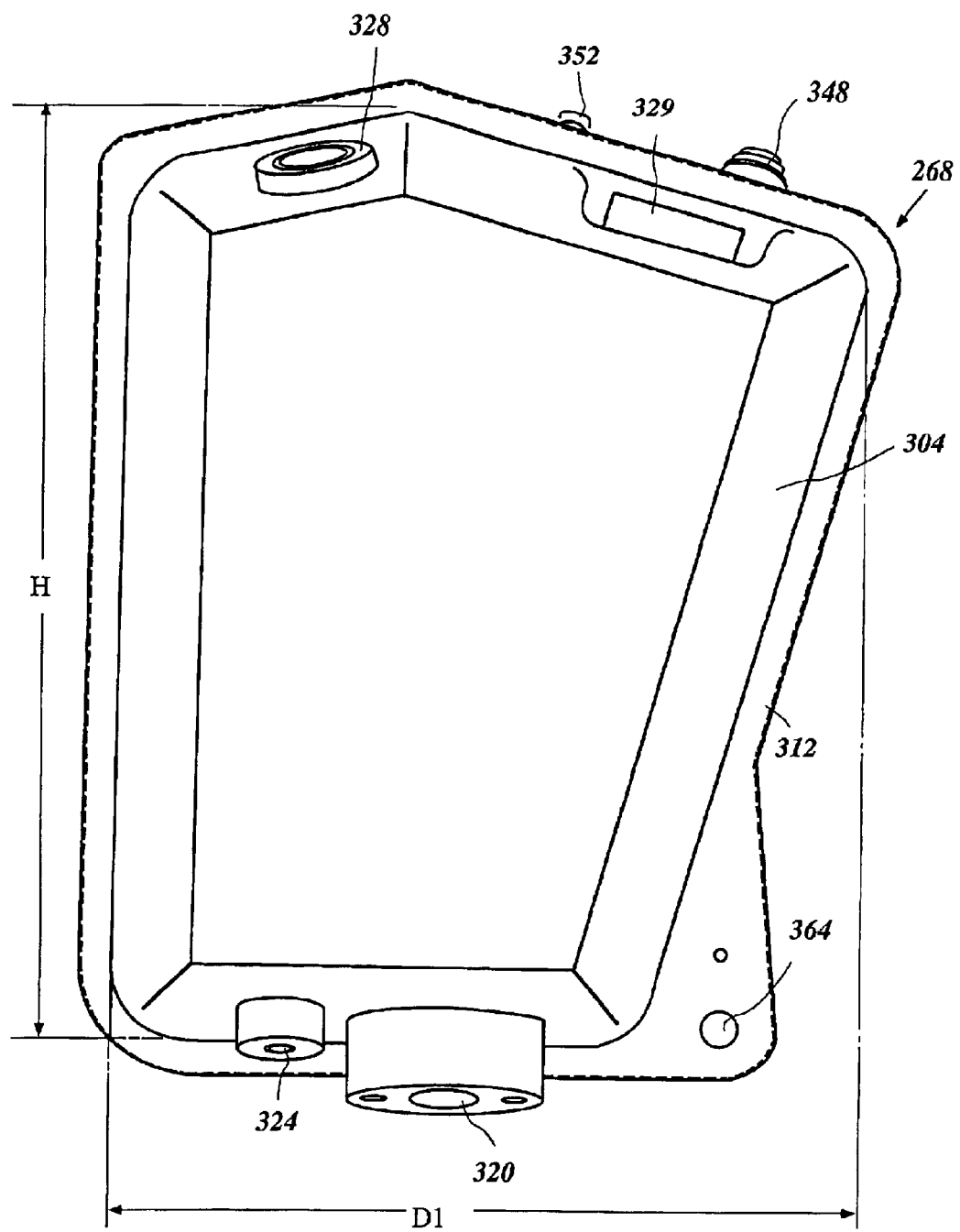
FIG. 5 is a side elevation view of one embodiment of a lubricant tank showing an outwardly facing side of the lubricant tank.
Figure 11:
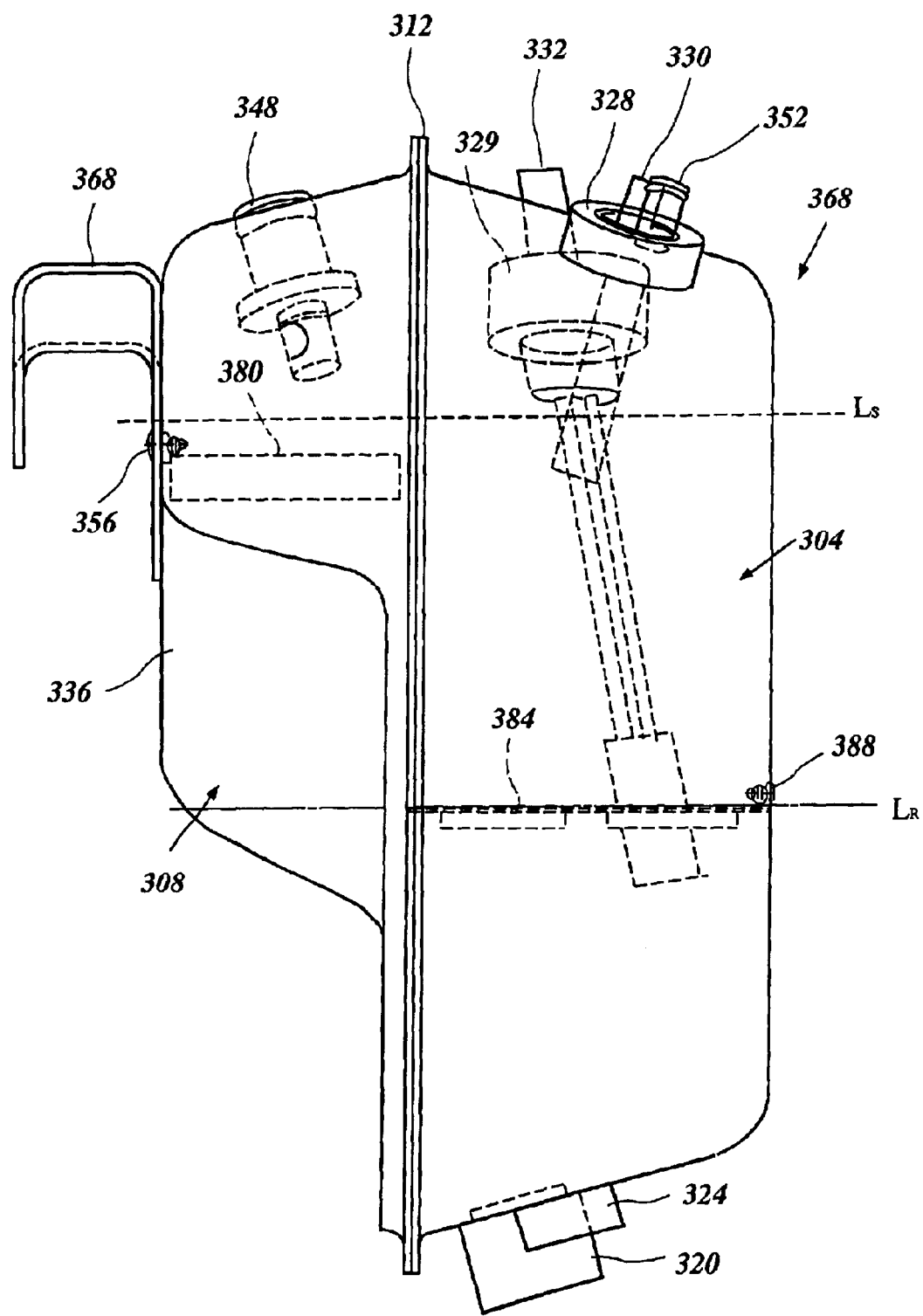
FIG. 11 is a rear elevation view of the lubricant tank of FIG. 10 with portions shown in hidden lines to better illustrate certain features, aspects and advantages of the present invention.
Figure 12A:
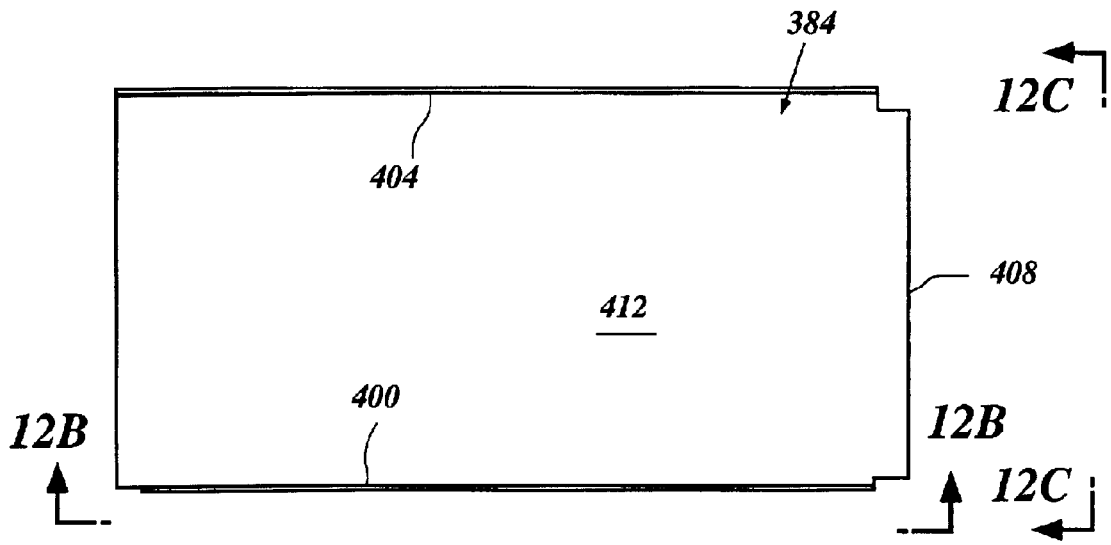
FIGS. 12A–12C illustrate one embodiment of a guide incorporated into some embodiments of the lubricant tank described herein.
Figure 12B:
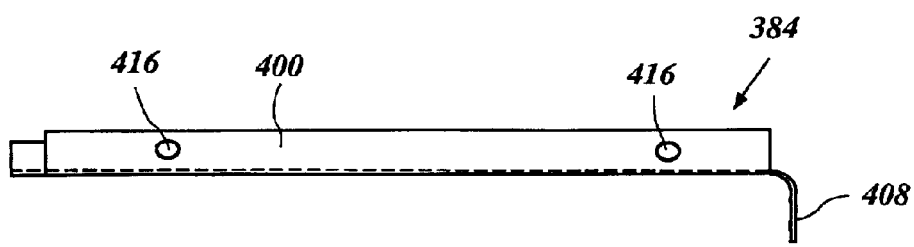
Figure 12C:
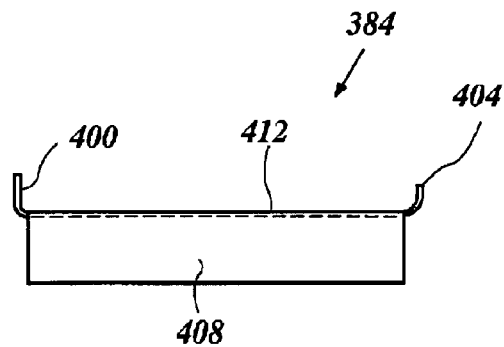

In some embodiments, the lubricant tank 268 also provides a plurality of lubricant level sensing components. With reference to FIGS. 5 and 11, the first lateral portion 304 of the lubricant tank 268 includes a lubricant level gauge boss 328 and a lubricant level sensor boss 329. The lubricant level gauge boss 328 provides an aperture into which a lubricant level gauge 330 can be inserted and retained during operation of the snowmobile 20. The lubricant level gauge 330 visually indicates how much lubricant is in the lubricant tank 268 and thereby indicates the amount of lubricant being circulated through the lubrication system of the engine 28. The lubricant level within the lubricant tank 268 varies depending upon whether the engine 28 is or is not running, among other factors. As can be seen in FIG. 11, when the engine 28 is stopped, the lubricant preferably resides at a lubricant level $L_S$. The length of the lubricant level gauge 330 is determined, in part, by the expected lubricant level $L_S$. As is known, the lubricant level gauge 330 is configured to be long enough to extend beyond the expected non-operating lubricant level $L_S$ and to have a series of graduation markings that indicate the actual lubricant level $L_S$ compared to the expected lubricant level $L_S$.

The lubricant level sensor boss 329 provides an aperture into which a lubricant sensor 332 can be inserted. This lubricant level sensor 332 gathers data relating to the volume of lubricant in the tank while the engine 28 is running. These data are processed in a suitable manner to provide an alarm or warning to the user during operation of the snowmobile 20 when the lubricant level is too low. As can be seen in FIG. 11, when the engine 28 is running, a lubricant level $L_R$ results. The lubricant level $L_R$ may vary depending upon the angular speed of the engine and other factors. The length of the lubricant sensor 332 is determined, in part, by the expected lubricant level $L_R$ during the highest lubricant demand condition (e.g., highest angular speed). In general, the lubricant level sensor 332 is configured to extend much further down into the lubricant tank 268 than the lubricant level gauge 330. In some arrangements, two sensors can be used in which one sensor, for example gauge 330, provides an output to an oil level display and another sensor, for example, sensor 332, provides an output to an alarm device that will alert an operator to a low oil operating condition.

Preferably, the sensors 332 and gauges 330 indicators are mounted on the portion of the lubricant tank 268 that has the largest depth. By positioning the sensors 332 and gauges 330 in this position, the increased depth can be used to differentiate between true alarm conditions and false alarms caused by operating conditions, such as jumps, turns, and rapid accelerations or decelerations.

In one embodiment, the second lateral portion 308 includes an expansion portion 336, the recess portion 271, a shelf 344, an upper surface 345, and a lower surface 346. Both the upper surface 345 and the lower surface 346 face the engine 28 when the illustrated lubricant tank 268 is mounted in the engine compartment 26. The expansion portion 336 is the portion of the lubricant tank 268 that is located generally toward the upper portion 269 and is defined, in part, between the flange 312 and the upper surface 345. The recess portion 271 is the portion of the lubricant tank 268 that is located generally toward the lower portion 270 and is defined, in part, between the flange 312 and the lower surface 346. In general, the lateral distance between the flange 312 and the upper surface 345 is much greater than the lateral distance between the flange 312 and the lower surface 346. See FIG. 7. As discussed above, the recess portion 271 accommodates, in some embodiments, at least a portion of at least one laterally extending component of the engine 28. Where provided, the shelf 344 is a generally upwardly facing surface that extends between the expansion portion 336 and the recess portion 271. The illustrated shelf 344 also forms a surface that curves downwardly, i.e., the elevation of the end of the shelf 344 that is closest to the forward portion 272 of the lubricant tank 268 is higher than the elevation of the end of the shelf 344 that is closest to the rearward portion 273 of the lubricant tank 268. In the embodiment shown in FIGS. 6 and 7, the shelf forms a continuous curved surface between these two ends. The slope between the ends also can be reversed such that the forward portion is lower than the rearward portion. The sloping allows the lubricant to gently return to the supply pool during engine operation such that air entrainment can be reduced.

Figure 6:
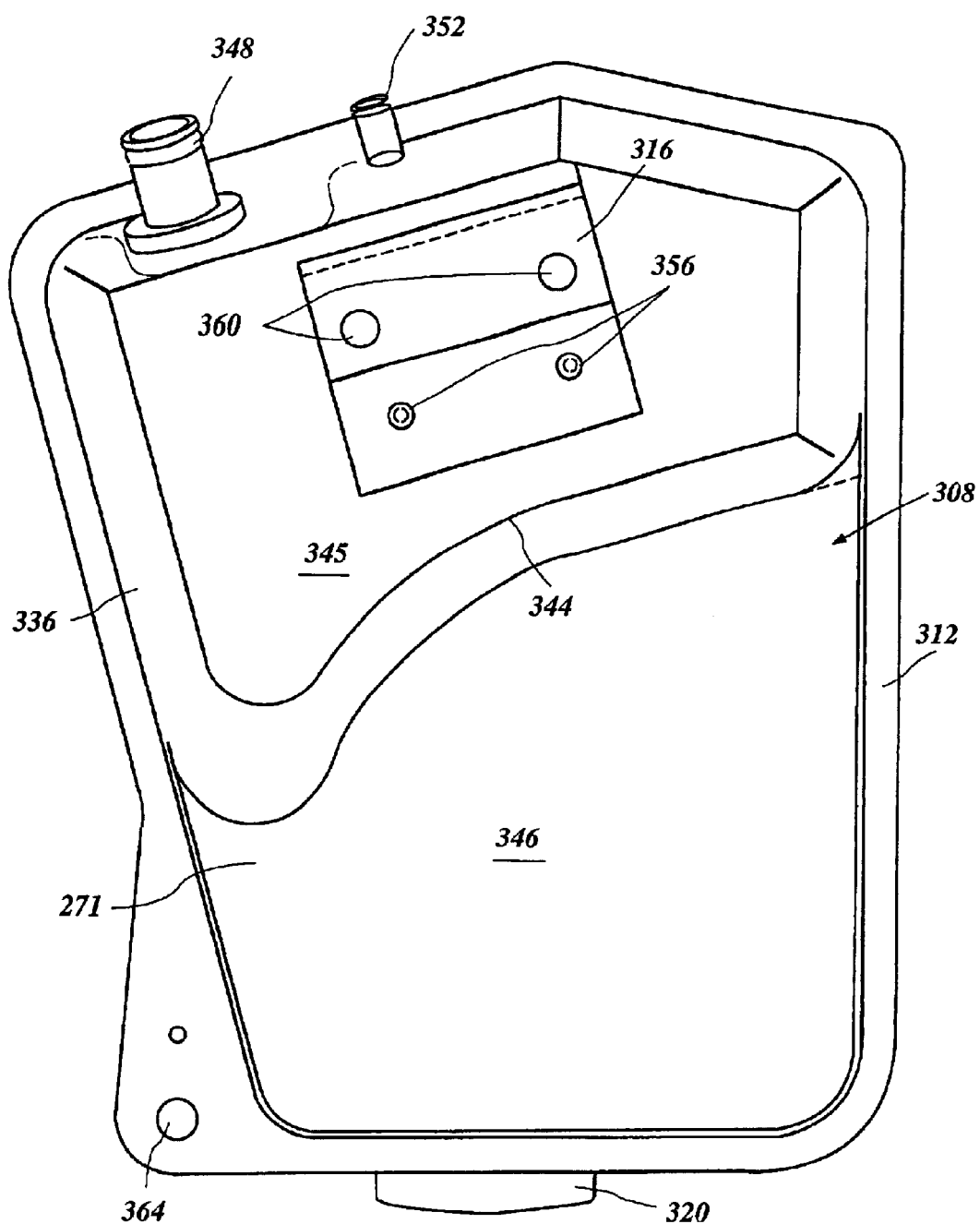
FIG. 6 is a side elevation view of the lubricant tank of FIG. 5 showing an inwardly facing side of the lubricant tank.
Figure 7:
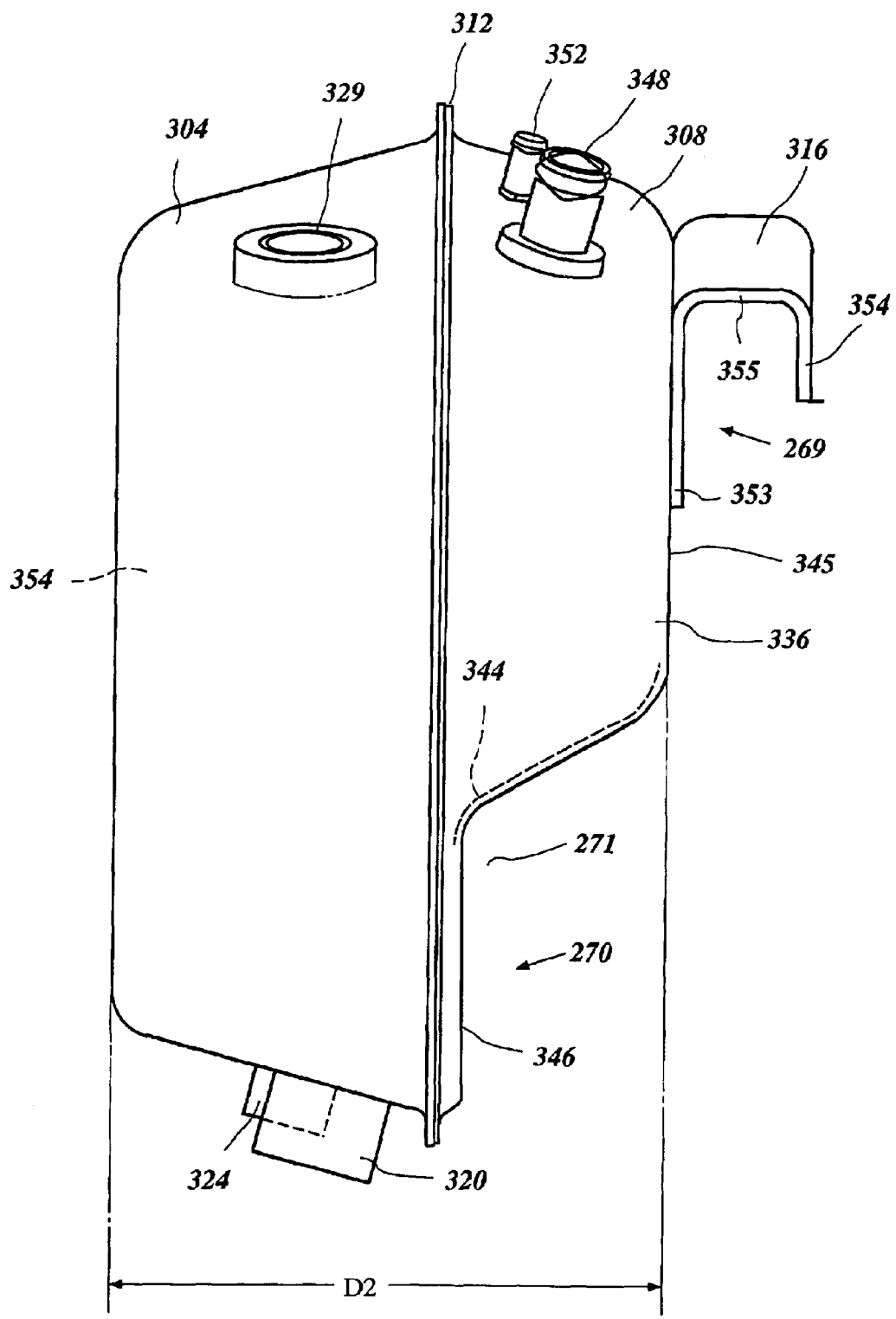
FIG. 7 is a front elevation view of the lubricant tank of FIG. 5 showing a forward portion of the lubricant tank.
Figure 8:
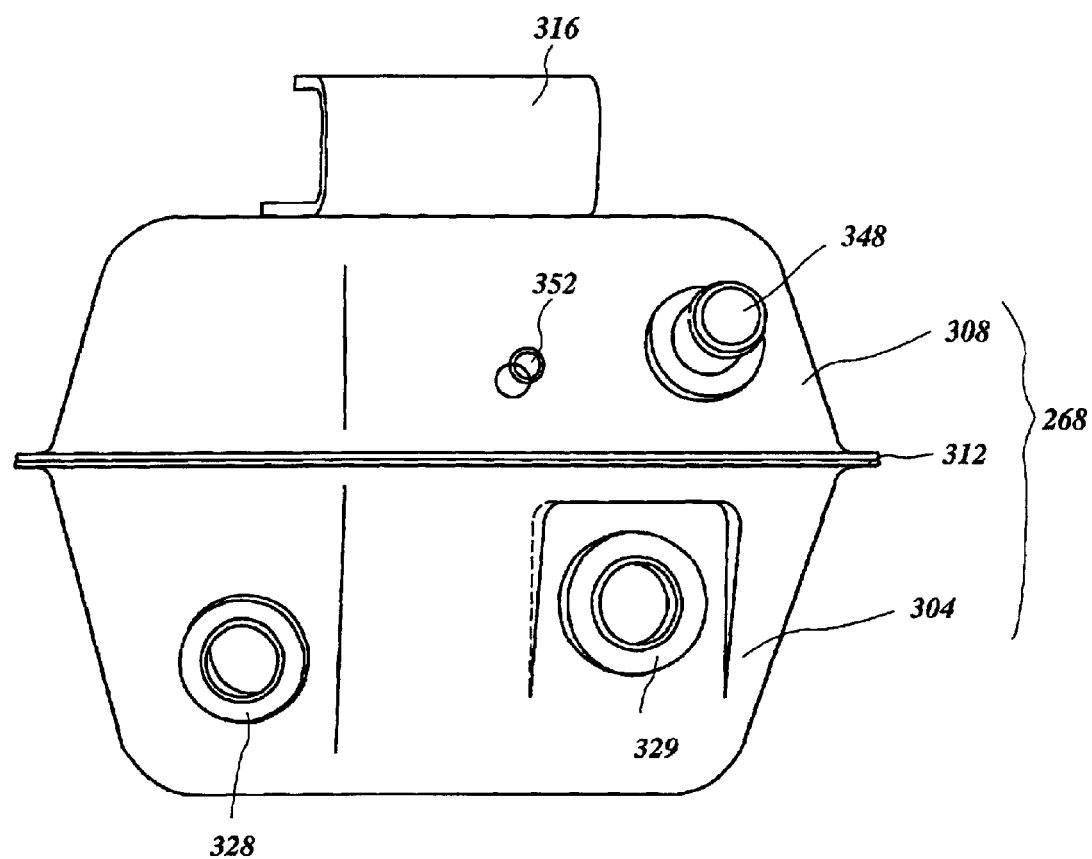
FIG. 8 is a top view of the lubricant tank of FIG. 5 showing an upper portion of the lubricant tank.
Figure 9:
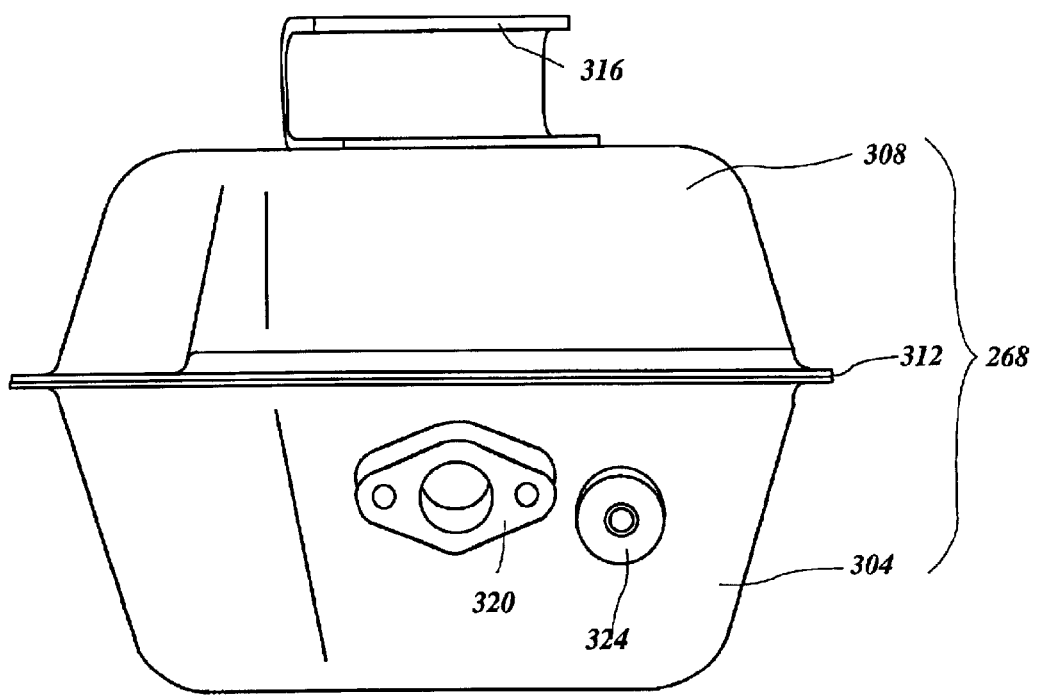
FIG. 9 is a bottom view of the lubricant tank of FIG. 5 showing a lower portion of the lubricant tank.

In one embodiment, the second lateral portion 308 also includes a lubricant return port 348 and a breather pipe connection port 352. As illustrated in FIGS. 6 and 7, the lubricant return port 348 is provided proximate the top of the second lateral portion 308. Lubricant returns to the lubricant tank 268 through the lubricant return port 348 after circulating through the engine 28. The lubricant that flows through the lubricant return port 348 is directed thereby generally toward in the inside surface of the expansion portion 336 and generally toward the rearward portion 273 of the lubricant tank 268. As discussed, where the shelf portion 344 is provided, the lubricant is then directed downward to the shelf portion 344, which further directs the lubricant toward the lower portion 270 of the lubricant tank 268.

In one embodiment, the breather pipe connection port 352 is provided proximate the top of the second lateral portion 308 of the lubricant tank 268. In another embodiment, the breather pipe connection port 352 is provided on the first lateral portion 304 of the lubricant tank 268. In this embodiment, when the lubricant tank 268 is mounted in the snowmobile 20, the breather pipe connection port 352 is offset toward a lateral side of the snowmobile 20. In one embodiment, a first end of a breather pipe (not shown) is connected to the breather pipe connection port 352 and a second end of the breather pipe (not shown) communicates with the atmosphere. The contents of the lubricant tank 268 thus communicates with the atmosphere. This breather pipe dissipates pressures that can build up in the lubricant tank 268 due to the flow and movement of lubricant. In one embodiment, the second end of the breather pipe is connected to a cam shaft chamber 221 of the engine 28. In another embodiment, the second end of the breather pipe communicates with the crankcase chamber 226 of the engine 28. In a further embodiment, the second end of the breather pipe communicates with both the cam shaft chamber 221 and with the crankcase chamber 226.

Referring now to FIG. 7, as discussed above, the second lateral portion 308 is provided with the bracket 316 that has a "J" shape in the illustrated arrangement. The bracket 316 is preferably provided on the expansion portion 336 of the second lateral portion 308. The J-shaped bracket includes a first leg 353, a second leg 354, and a spacer portion 355 between the first leg 353 and the second leg 354. The first leg 353, which is generally longer than the second leg 354, is attached to the second lateral portion 308 of the lubricant tank 268 such that the "J" is inverted. The spacer portion 355 extends between the first leg 353 and the second leg 354 and spaces the second leg 354 outwardly from the outside surface of the expansion portion 336 of the second lateral portion 308.

The bracket 316 connects the lubricant tank 268 to the snowmobile 20, e.g., to the frame 22, to the engine 28, or to any other suitable component within the engine compartment 26. A plurality of mounting fasteners 356 connect the bracket 316 to the lubricant tank 268. The mounting fasteners 356 preferably are rivets, though any suitable fastener will work, including an adhesive. The bracket 316 could also be a molded portion of the second lateral portion 308 or could be a separate bracket 316 that is affixed to the second lateral portion 308 when the second lateral portion is constructed.

The bracket 316 also preferably includes a plurality of mounting holes 360. In one embodiment, the mounting holes 360 are provided on the portion of the second leg 354 of the J-shaped bracket 316. The mounting holes 360 are sized to receive fasteners that affix the lubricant tank 268 to the snowmobile 20. The lubricant tank 268 also can be mounted to the snowmobile 20 via one or more flange mounting holes 364 provided on the flange 312, or by a combination of the flange mounting hole 364 and the mounting holes 360 on the bracket 316.

Referring now to FIGS. 10–13B, another embodiment of a lubricant tank 368 is shown. FIGS. 10–13B also show internal components of the lubricant tank 268 and the lubricant tank 368. The lubricant tank 368 is similar to the lubricant tank 268, except as discussed below. The lubricant tank 368 includes a first lateral portion 372, a second lateral portion 376, and the flange 312, which is also positioned or defined by the connection location between the two portions. The first lateral portion 372 includes the lubricant supply port 320, the lubricant drain 3,24, the lubricant level gauge boss 328, the lubricant level sensor boss 329, and the breather pipe connection port 352. The second lateral portion 376 includes the lubricant return port 348.

The lubricant tank 368 preferably includes a guide 380 and a baffle 384. The guide 380 is mounted within the lubricant tank 368 generally horizontally at an elevation between the lubricant return port 348 and the top of the forward-most end of the shelf portion 344. In one arrangement, the guide 380 is positioned between the lubricant return port 348 and the running level $L_R$ of lubricant. In another arrangement, the guide 380 is positioned slightly below the stopped level $L_S$ of lubricant, but above the running level $L_R$ of lubricant such that the guide 380 is vertically below the return port 348. Preferably, the guide 380 is disposed over the shelf portion 344.

In one embodiment, the fasteners 356 that connect the J-shaped bracket 316 to the outside surface of the second lateral portion 376 also connect the guide 380 to the inside surface of the second lateral portion 376. As discussed above, any suitable fastener can be used, including rivets.

The baffle 384 is mounted within the lubricant tank 368 at about the same elevation as a lowermost portion of the shelf portion 344. In one arrangement, the baffle 384 is positioned approximately at or slightly below the running level $L_R$ of lubricant. The placement of the baffle 384 preferably encourages lubricant to flow from the shelf portion 344 onto the baffle 384. As with the guide 380, the baffle 384 is connected to the lubricant tank 368 by at least one mounting fastener 388. As with the mounting fasteners 356, the mounting fasteners 388 preferably are rivets, though any suitable fastener will work. The fasteners 388 preferably connect the baffle 384 to the first lateral portion 372. The baffle 384 could also be connected to the second lateral portion 376.

Figure 13A:
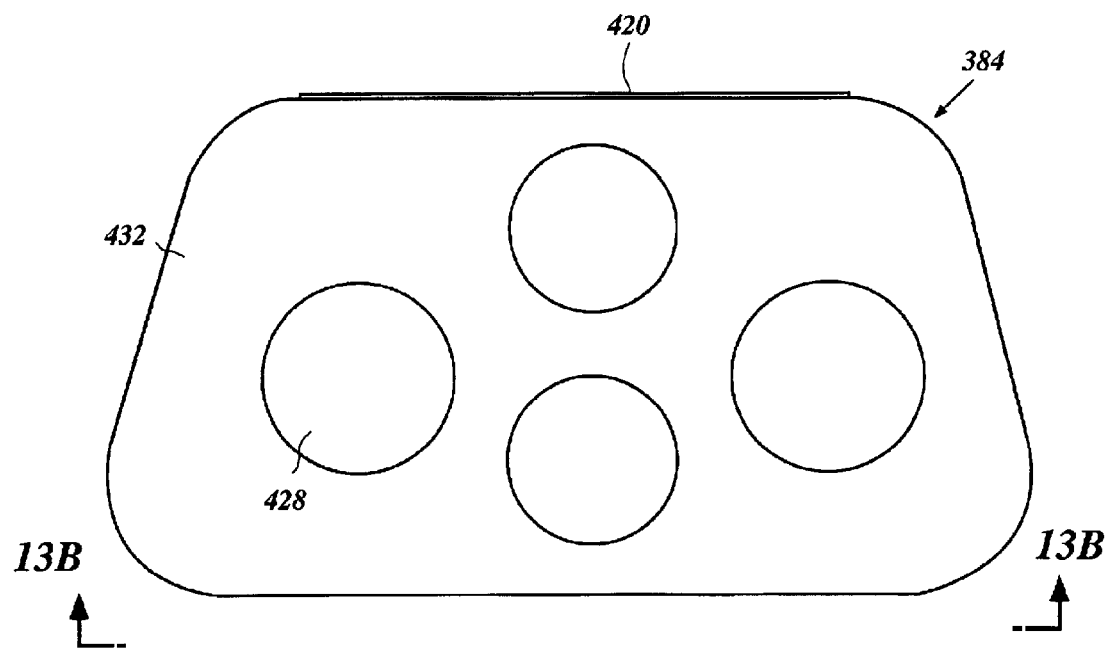
FIGS. 13A—13B illustrate one embodiment of a baffle that is incorporated into some embodiments of the lubricant tank described herein.
Figure 13B:
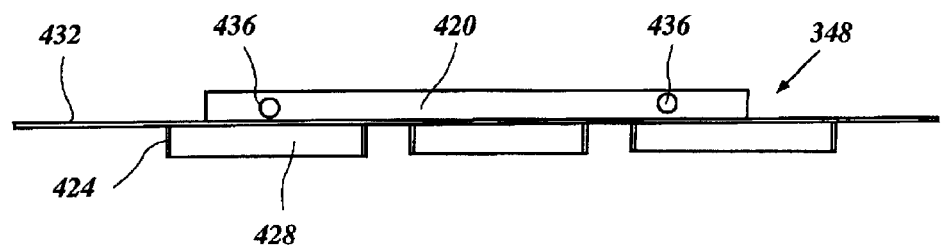

Referring to FIGS. 13A–13C, the guide 384 includes a guide mount rim 400, a guide rim 404, a spout 408, and a generally flat portion 412. The guide mount rim 400 is configured to receive the fasteners 356 so that the guide 384 can be mounted within the lubricant tank 368. In one embodiment, the guide mount rim 400 is an upwardly turned edge of the generally flat portion 412. The guide mount rim 400 preferably forms about a ninety degree angle with the generally flat portion 412. In one embodiment, the guide mount rim 400 is provided with at least one through-hole 416 that receives elongate fasteners, such as rivets (see FIG. 12B). In one embodiment, the guide mount rim 400 is provided on a side of the guide 384 that faces the inside surface of the first lateral portion 372 so that the guide 384 can be attached to the first lateral portion 372. In another embodiment, the guide mount rim 400 is provided on a side of the guide 384 that faces the inside surface of the second lateral portion 376 of the lubricant tank 368 so that the guide 384 can be attached to the second lateral portion 376.

In one embodiment, the guide rim 404 is an upwardly turned edge of the generally flat portion 412. The guide rim 404 preferably forms about a ninety degree angle with the generally flat portion 412. As discussed above, lubricant is directed from the lubricant return port 348 generally rearwardly against the inside surface of the expansion portion 336 of the second lateral portion 376. The lubricant then flows or drips downward on the inside surface of the expansion portion 336 to the guide 384. Lubricant then flows across the flat portion 412 of the guide 380, generally rearwardly toward the spout 408. However, the guide rim 404 prevents the lubricant from splashing down on the baffle 384.

Instead of splashing over a lateral side of the guide 380, the lubricant preferably is directed to the spout 408. In one embodiment, the spout 408 is an downwardly turned edge of the generally flat portion 412. The spout 408 preferably forms about a ninety degree angle with the generally flat portion 412, but any suitable angle or configuration will work. The generally flat portion 412 is a generally planar element that extends between the mount rim 400, the guide rim 404, and the spout 408. Where the shelf portion 344 is provided, the guide 384 directs the lubricant onto the shelf portion 344 proximate the forward-most end of the shelf portion 344. This advantageously allows the lubricant to fall a relatively short distance from the spout 408 onto the forward-most end of the shelf portion 344, resulting in less splashing within the lubricant tank 368. The curved surface of the shelf portion 344 conducts the lubricant downwardly and rearwardly within the lubricant tank 368 toward the baffle 384.

Referring to FIGS. 10, 11, and 13A–13B, the baffle 384 preferably includes a baffle mount rim 420, at least one edge piece 424, a spill port 428 defined by each edge piece 424, and a generally planar element 432 that extends between the first lateral portion 372 and the second lateral portion 376. In the illustrated embodiment, the baffle 384 includes four spill ports 428. However, other numbers of spill ports 428 could also be used within the scope of the claims attached hereto.

Figure 10:
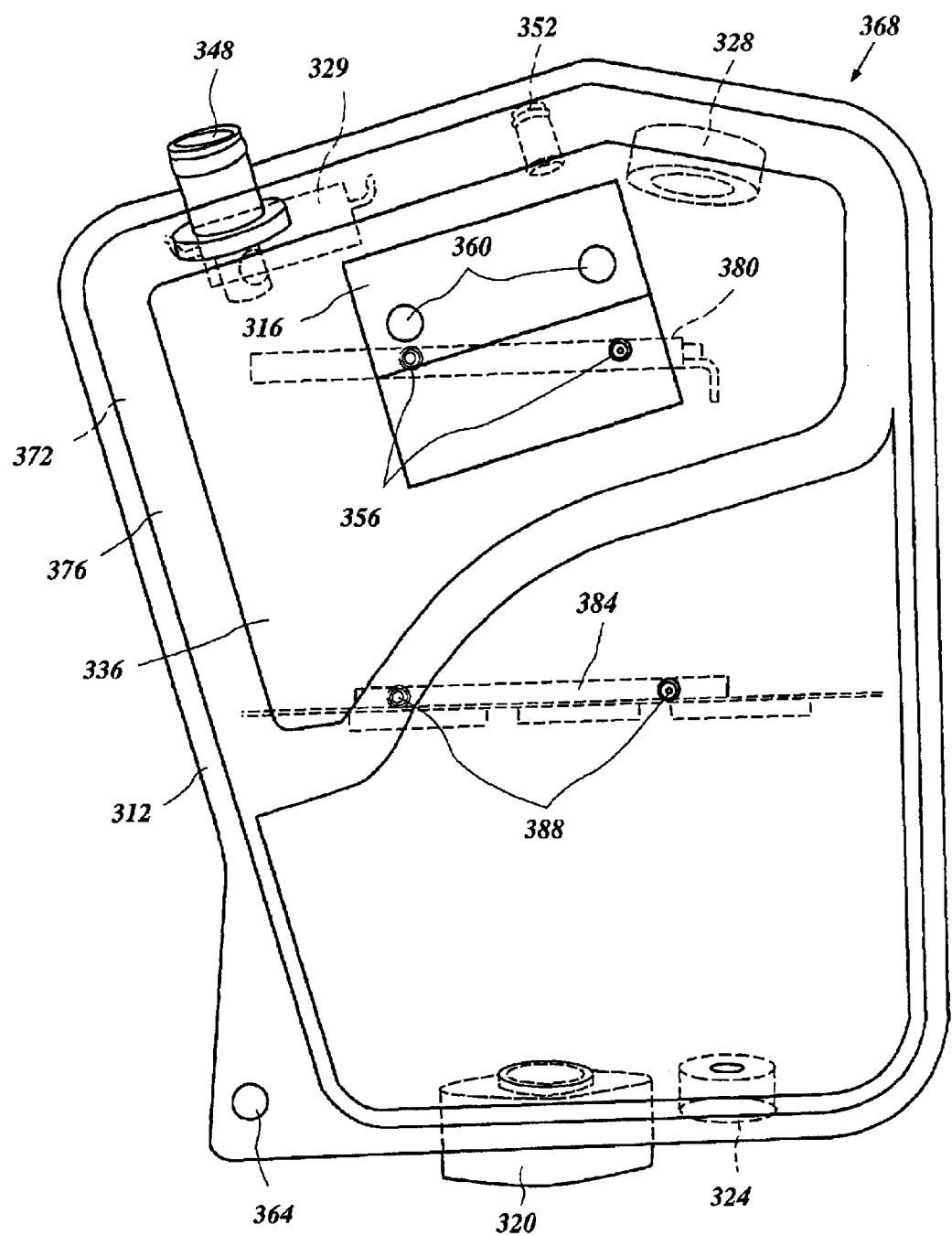
FIG. 10 is a side elevation view of the inwardly facing side of one embodiment of a lubricant tank, with portions shown in hidden lines to better illustrate certain features, aspects and advantages of the present invention.

In one embodiment, the baffle mount rim 420 is provided with at least one through-hole 436 that receives elongate fasteners 388, which can be rivets (See FIGS. 10 and 13B). The baffle 384 is thus mounted to either the first lateral portion 372 or the second lateral portion 376. Lubricant flows down the shelf portion 344 onto the baffle 384. Among other functions, the baffle 384 receives the downward flow of the lubricant in a manner that reduces the formation of gas bubbles in the lower portion of the lubricant tank 368. This, in turn, reduces the tendency of gas to be entrained in the lubrication system downstream of the lubricant tank 368. This advantageously improves the performance of the lubricant within the lubrication system.

In use, the lubricant is returned to the lubricant tank 368 via the return port 348. The lubricant is directed in a direction that allows the lubricant to pass along the guide 384. The guide preferably has side walls or other structures that direct the lubricant along its length. At the end of the guide 384, the lubricant falls a relatively short distance to the shelf portion 344. At the end of the shelf portion, the lubricant is laterally directed onto the baffle plate 384 or into a collection area at an elevation above the baffle plate. To return to circulation, therefore, the lubricant passes through the baffle plate and into the balance of the lubrication system. Advantageously, the illustrated arrangement provides a number of short cascades, each of which operates to reduce the amount of air that will be entrained in the lubricant during the return of the lubricant from the lubrication system to the lubricant contained within the lubrication system. This illustrated construction also directs the lubricant through a tortuous path that allows some air bubbles to escape due to the relatively low flow profile and the gentle drops to each member in the cascade.

Referring to FIG. 11, the baffle 384 is also advantageously configured to receive a portion of the lubricant level sensor 332. In one embodiment, one of the spill ports 428 is sized and located to receive the lower-most portion of the lubricant level sensor 332. As discussed above, the lubricant level sensor 332 indicates the level of the lubricant when the engine 28 is running. As illustrated in FIG. 11, the expected lubricant level in the running state $L_R$ is about at the same elevation as the baffle 384. Accordingly, by providing the lubricant level sensor 332 at a elevation below the baffle 384, the rider can be warned if the lubricant level falls too low.

Of course, the foregoing description is that of a preferred construction having certain features, aspects and advantages in accordance with the present invention. It will be understood by those skilled in the art that the present invention extends beyond the specifically disclosed embodiment to other alternative embodiments and/or uses of the invention and obvious modifications and equivalents thereof. Various changes and modifications can be made to the above-described embodiment without departing from the spirit and scope of the invention. It thus is intended that the scope of the present invention herein disclosed should not be limited by the particular disclosed embodiment described above, but should be determined only by a fair reading of the claims that follow.

What is claimed is:

1. A snowmobile comprising a frame assembly having a forward portion, a forward body cover disposed over the forward portion of the frame assembly, the forward body cover at least partially defining an engine compartment, an engine being mounted in the engine compartment, the engine comprising an engine body defining a cam shaft chamber and a crankcase chamber, an auxiliary component protruding laterally of the engine body, the engine further comprising a crankshaft that extends generally transverse to a generally vertical longitudinal center plane of the frame assembly, a lubricant tank comprising a forward portion and a rearward portion and being mounted within the engine compartment on a lateral side of the engine body.

2. The snowmobile of claim 1, wherein the lubricant tank further comprises a recess portion located on the side of the lubricant tank that faces the engine body when the lubricant tank is mounted in the engine compartment, the recess portion receiving at least a portion of the auxiliary component.

3. The snowmobile of claim 2, wherein the recess portion is located adjacent a lower portion of the lubricant tank.

4. The snowmobile of claim 1, further comprising a brake assembly located generally rearward of the lubricant tank, a ventilation opening defined in the forward body cover, an engine compartment exhaust port located generally rearward of the brake assembly, the ventilation opening and the engine compartment exhaust port communicating with the atmosphere and the engine compartment, and an airflow path extending between the ventilation opening and the engine compartment exhaust port such that the airflow passes the lubricant tank and the brake assembly.

5. The snowmobile of claim 4, further comprising a breather pipe connection port located on an upper portion of the lubricant tank at a location offset toward a lateral side of the snowmobile and a breather pipe, the breather pipe having a first end connected to the breather pipe connection port and a second end connected to at least one of the cam shaft chamber and the crankcase chamber.

6. The snowmobile of claim 5, wherein the lubricant tank further comprises an expansion portion, a recess portion, a shelf extending between the expansion portion and the recess portion, a lubricant supply port located proximate a lower portion of the lubricant tank, and a lubricant return port at an elevation above the shelf, lubricant entering the tank through the lubricant return port being directed onto the shelf before returning to the lower portion of the lubricant tank.

7. The snowmobile of, claim 6, wherein the lubricant tank further comprises a drain formed at the bottom of the lubricant tank for removing the lubricant from the lubricant tank.

8. The snowmobile of claim 6, wherein the lubricant tank further comprises an inside surface, an outside surface, and a guide secured to the inside surface of the lubricant tank, the guide being positioned between the lubricant return port and the shelf.

9. A snowmobile comprising a frame assembly, an engine positioned above a portion of the frame assembly, the engine comprising an engine body, the engine body comprising a crankcase member, a cylinder block and a cylinder head, a crankcase chamber being partially defined by the crankcase member, a crankshaft extending through the crankcase, the crankshaft extending a transverse direction relative to a general direction of movement of the snowmobile, a lubricant tank being disposed to one lateral side of the engine such that a rotational axis of the engine intersects a portion of the lubricant tank, the lubricant tank comprising an enlarged upper portion and a reduced lower portion, the upper portion and the lower portion sharing at least one surface such that a recess region is defined below a portion of the upper portion and to a side of the lower portion, a lubricant return port being located in the upper portion of the lubricant tank and a guide being located in the lubricant tank generally below the lubricant return port, the lubricant tank further comprising a baffle that is disposed vertically lower than the guide and that is positioned generally to one side of the guide at a position within the lower portion of the lubricant tank.

10. The snowmobile of claim 9, wherein the lubricant tank comprises an outer surface that comprises two portions joined together at a flange, the flange being positioned in a generally vertical longitudinal plane that is generally parallel to and offset from a generally vertical longitudinal center plane of the snowmobile.

11. The snowmobile of claim 9, wherein the guide comprises a mounting rim affixed to an inner surface of the lubricant tank and a downturned spout.

12. The snowmobile of claim 11, wherein the guide further comprises a generally planar portion that extends between the mounting rim and the downturned spout.

13. The snowmobile of claim 9, wherein the baffle comprises a plate, a mounting portion connected to the plate and at least one passage extending through the plate.

14. The snowmobile of claim 13 further comprising a sensor that extends through the at least one passage in the baffle.

15. The snowmobile of claim 14, wherein the sensor is mounted to a boss formed in the upper portion of the lubricant tank.

* * * * *

UNITED STATES PATENT AND TRADEMARK OFFICE
CERTIFICATE OF CORRECTION

PATENT NO. : 6,848,529 B2
DATED : February 1, 2005
INVENTOR(S) : Takashi Moriyama It is certified that error appears in the above-identified patent and that said Letters Patent is hereby corrected as shown below:

Title page,
Item [56], References Cited, U.S. PATENT DOCUMENTS, after "Ohrnberger" delete "123/198E" and insert -- 123/195A --.

Column 16,
Line 17, after "of" delete ",".

Signed and Sealed this

Seventh Day of February, 2006

JON W. DUDAS
*Director of the United States Patent and Trademark Office*